United States Patent [19]
Childree

[11] Patent Number: 5,820,015
[45] Date of Patent: Oct. 13, 1998

[54] PROCESS FOR IMPROVING THE FILLET-FORMING CAPABILITY OF BRAZEABLE ALUMINUM ARTICLES

[75] Inventor: David L. Childree, Livermore, Calif.

[73] Assignee: Kaiser Aluminum & Chemical Corporation, Pleasanton, Calif.

[21] Appl. No.: 626,336

[22] Filed: Apr. 2, 1996

[51] Int. Cl.$^6$ .......................... B23K 1/20; B23K 35/363
[52] U.S. Cl. ................. 228/206; 228/211; 228/262.51
[58] Field of Search ................... 228/206, 207, 228/262.51, 211

[56] References Cited

U.S. PATENT DOCUMENTS

| | | | |
|---|---|---|---|
| 2,907,104 | 10/1959 | Brown et al. | 228/207 |
| 2,956,846 | 10/1960 | McCullough | 309/14 |
| 2,957,239 | 10/1960 | Pritchard et al. | 228/206 |
| 3,393,447 | 7/1968 | Paul | 29/494 |
| 3,576,832 | 4/1971 | Becker et al. | 260/448 |
| 3,619,181 | 11/1971 | Willey | 75/138 |
| 3,779,839 | 12/1973 | Kaihu et al. | 156/3 |
| 3,818,566 | 6/1974 | Anderson et al. | 29/195 |
| 3,938,991 | 2/1976 | Sperry et al. | 75/143 |
| 3,951,328 | 4/1976 | Wallace et al. | 228/207 |
| 4,039,298 | 8/1977 | Anthony et al. | 428/558 |
| 4,222,774 | 9/1980 | Boutin et al. | 75/148 |
| 4,224,086 | 9/1980 | Stokes, Jr. et al. | 148/26 |
| 4,235,628 | 11/1980 | Althoff et al. | 75/148 |
| 4,556,165 | 12/1985 | Yamawaki et al. | 228/223 |
| 4,571,368 | 2/1986 | Fenoglio et al. | 428/654 |
| 4,579,605 | 4/1986 | Kawase et al. | 148/26 |
| 4,636,356 | 1/1987 | Iwasaki et al. | 420/532 |
| 4,649,087 | 3/1987 | Scott et al. | 428/654 |
| 4,802,935 | 2/1989 | Crona et al. | 148/437 |
| 4,806,211 | 2/1989 | Timm et al. | 204/29 |
| 4,828,794 | 5/1989 | Scott et al. | 420/529 |
| 5,102,033 | 4/1992 | Woods et al. | 228/206 |

FOREIGN PATENT DOCUMENTS

| | | | |
|---|---|---|---|
| 3104107 | 8/1982 | Germany | 228/206 |

*Primary Examiner*—P. Austin Bradley
*Assistant Examiner*—Jeffrey T. Knapp
*Attorney, Agent, or Firm*—P. L. McGarrigle; G. D. Haynes

[57] ABSTRACT

A process for improving the fillet-forming capability of brazeable aluminum articles includes providing a brazeable aluminum article, having at least one surface; and contacting the surface with a dilute, aqueous solution of fluoridic compounds, for at least 5 seconds at a temperature ranging from about 150° to 212° F. to produce an oxide-free surface which can be readily brazed with a minimal drip loss.

15 Claims, 2 Drawing Sheets

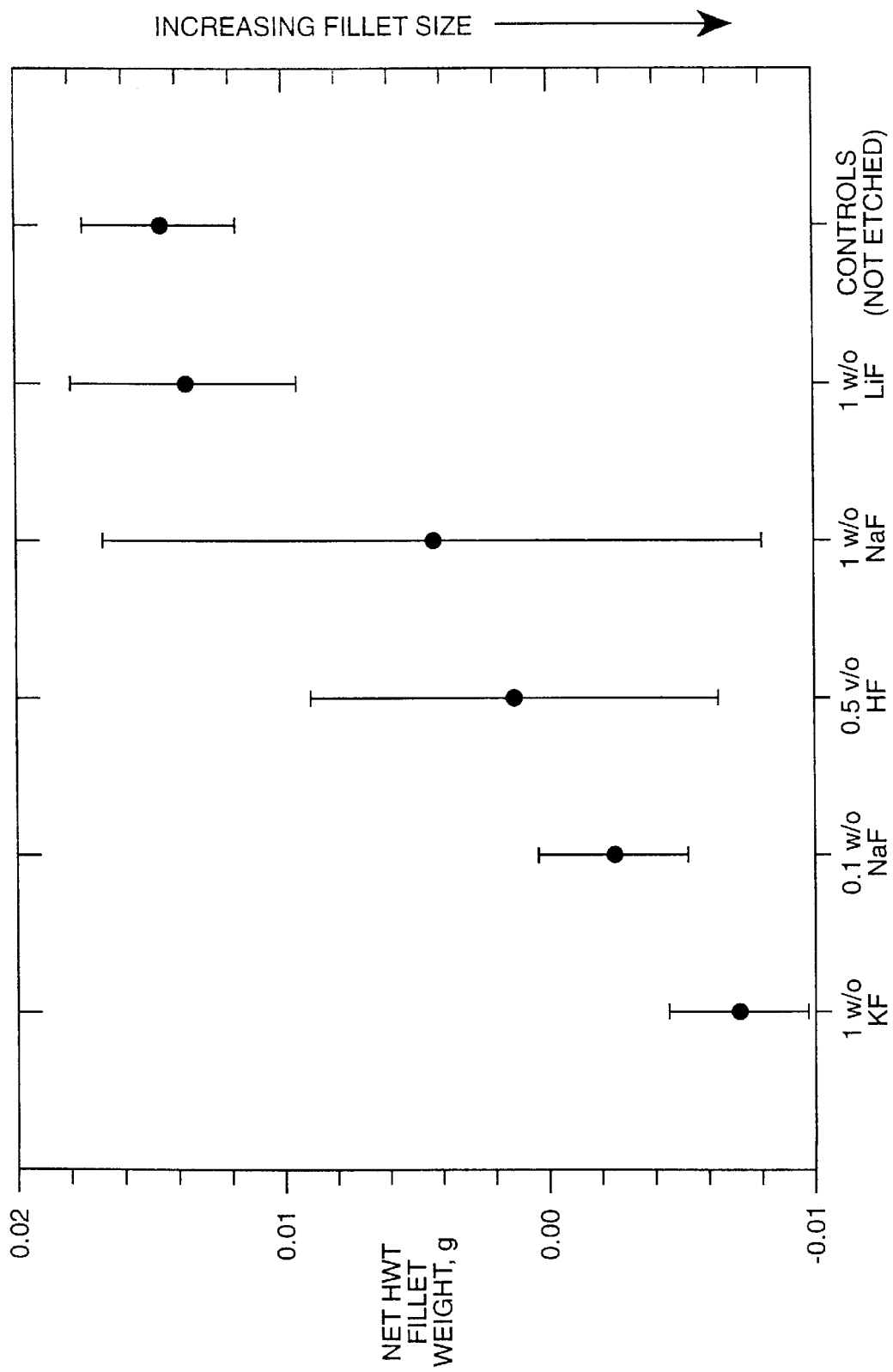
FIG._1

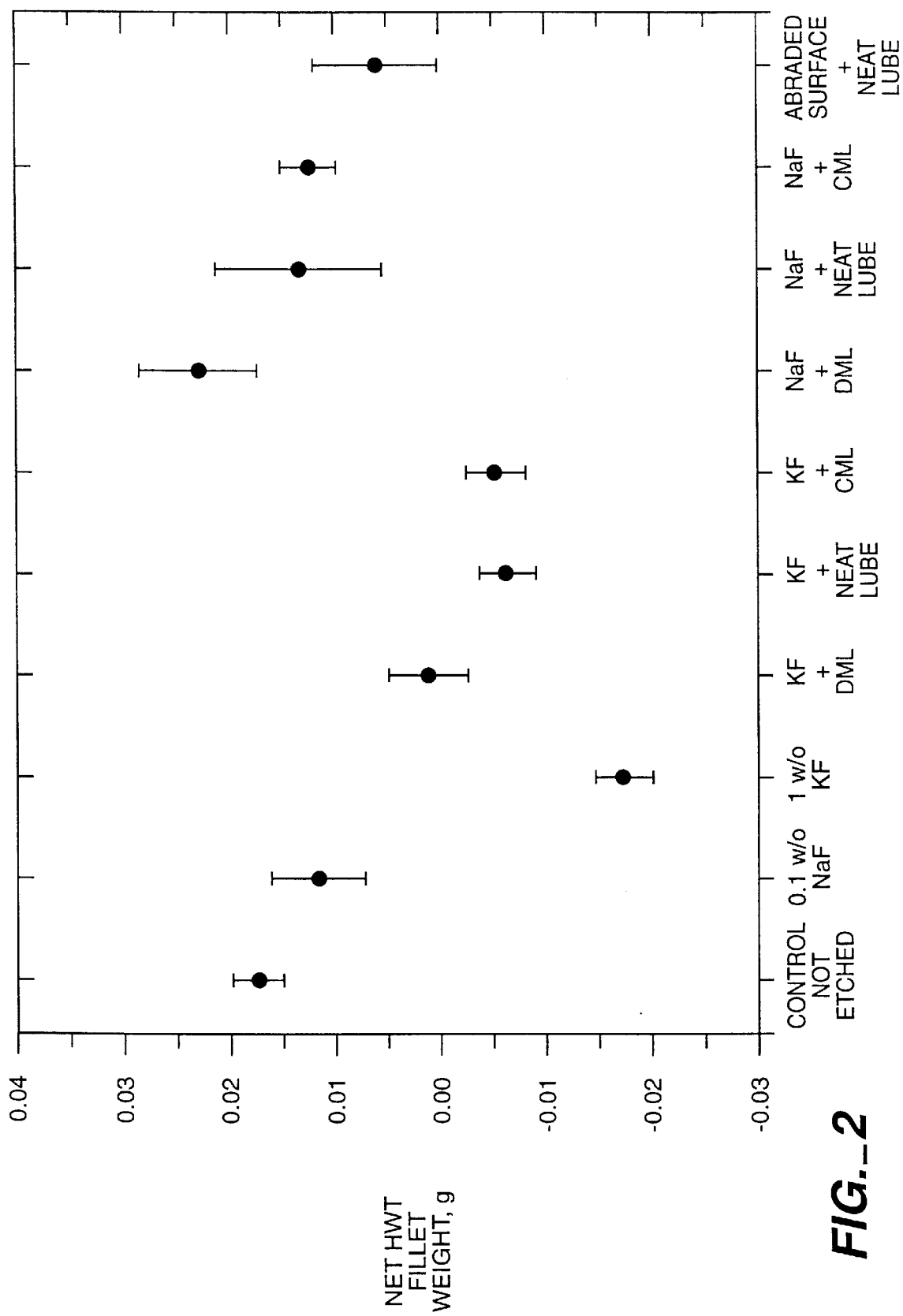
FIG._2

PROCESS FOR IMPROVING THE FILLET-FORMING CAPABILITY OF BRAZEABLE ALUMINUM ARTICLES

BACKGROUND OF THE INVENTION

1. Field of the Invention

This invention relates to a process for improving the fillet-forming capability of brazeable aluminum alloy articles. More particularly, it relates to pretreating the surfaces of aluminum vacuum brazing sheet and components of heat-exchanger assemblies, such as tubes, fins, headers and the like, with a dilute aqueous fluoridic salt solution to improve fillet-forming capability.

2. Description of the Related Art

Workers in the field often use brazing to join aluminum alloy components and in particular, brazing is the preferred for joining aluminum heat exchanger assemblies. The surface of aluminum articles is most often coated with a tenacious oxide layer and unless the oxide layer is removed before brazing it will be impossible to obtain a strong, high quality, defect-free bond between the articles to be joined. Strong, high quality, defect-free bonds are desired in order to achieve high mechanical strength, improved corrosion resistance, and leak-free joints.

In the past, workers in the field removed oxide layers from the aluminum surfaces to be brazed by treatment with a solid flux containing a mixture of chloride and fluoride compounds. Representative examples of these solid fluxes and their application to the aluminum surfaces are described in the following U.S. Pat. Nos. 3,393,447 to Paul, issued Jul. 23, 1968; No. 4,224,086 to Stokes, Jr. et al., issued Sep. 23, 1980; U.S Pat. No. 4,556,165 to Yamawaki et al, issued Dec. 3, 1985; and U.S Pat. No. 4,579,605 to Kawase et al, issued Apr. 1, 1986. All of the prebrazing treatments described in these patents use solid flux. Solid flux brazing, particularly in the case when the articles to be brazed have complex shapes, requires an involved part-brazing treatment process, which must be followed by a washing stage. This washing stage is necessary to remove unreacted flux and reacted fluxing residue from the treated surface.

To avoid the need of using solid fluxing compounds, workers in the field developed fluxless brazing. This process simultaneously modifies the oxide layer on the surface of the articles to be brazed allowing welding to occur and also accomplishes the brazing. Fluxless brazing generally involves the using controlled gettering of oxidizing species in the brazing environment by the evolution of active metallic vapors and the modified oxides. A good description of fluxless brazing techniques is given on pages 843–49 of the November 1970 issue of the Welding Journal.

Fluxless brazing, while it avoids the need of extensive washing and drying steps after the removal of the surface oxide coating, still requires expensive and complicated equipment. Moreover, the process is quite impractical where a large number of articles are to be treated, for example the production line brazing of automotive heat exchanger components.

The relevant literature also recommends using a chemical etching process for the removal of the oxide layer from the surfaces of aluminum articles to be brazed. For example, U.S. Pat. U.S Pat. No. 3,779,839 to Kaihu et al., issued Dec. 18, 1973 describes a chemical etching agent for pretreating aluminum articles to be joined by brazing. The etching agent is composed of a fluorine compound selected from the group of alkali metal fluorides, sodium acid fluoride and hydrogen fluoride (HF); a chlorine compound selected from NaCl and $MgCl_2$; and $CrO_3$. The ratio of $F^-/CrO_3$ being greater than 0.4. This etching solution, while capable of removing the oxide coating from the surface of the aluminum parts to be joined by brazing, creates environmental problems because of the use of the $CrO_3$ in the etching agent.

Thus, a need remains for a process to improve the fillet-forming capability of brazeable aluminum articles resulting in improved strength and roundness of the bond between the articles. Accordingly, it is an object of this invention to provide such a process.

SUMMARY OF THE INVENTION

The present provides a process for improving the fillet-forming capability of brazeable aluminum articles. It includes providing a brazeable aluminum article, having at least one surface; and contacting the surface with a dilute, aqueous solution of fluoridic compounds, for at least 5 seconds at a temperature ranging from about 150° to 212° F. to produce an oxide-free surface which can be readily brazed with a minimal drip loss.

The foregoing and other objects, features, and advantages of the invention will become more readily apparent from the following detailed description of the invention which proceeds with reference to the drawing.

BRIEF DESCRIPTION OF THE DRAWINGS

FIG. 1 shows the effect of different aqueous etchants on the brazeability of vacuum brazing sheet, (v/o=volume percent and w/o=weight percent) according to the present invention.

FIG. 2 shows the effectiveness of fluoride etchants to improve the brazeability of aluminum brazing sheet exposed to rolling mill lubricants, (w/o=weight percent) according to the present invention.

DETAILED DESCRIPTION OF THE INVENTION

This invention relates to a process for improving the fillet-forming capability of brazeable aluminum articles. More specifically, I have discovered that by treating the articles, prior to brazing, for a relatively short time period with an aqueous solution of a mixture fluoridic compounds, I can significantly improve the strength and roundness of the bond between the articles after brazing. Stated another way, my invention relates to etching the surface of aluminum vacuum brazing sheet with a dilute, aqueous solution of fluoridic compounds. Because of the dilute nature of the treating solution, the disposal problems associated with the spent treating solution are minimized, while the short treatment period allows the assembly line type treatment of brazeable aluminum articles.

For purposes of convenience and simplicity, when I use terms such as "vacuum brazing sheet" or "brazing sheet", I am referring to not only aluminum vacuum brazing sheet but also smoother aluminum surfaces as well which are generally used for making heat exchangers, for example fins, tubes, headers and radiator assemblies. For the purposes of this invention I define the expression "aluminum" to include aluminum alloys of the 1000, 3000, 4000, 5000, and 6000 series as defined by the Aluminum Association. The brazing material which can be successfully treated by the instant method also includes aluminum alloy sheet clad with a layer of aluminum wherein the cladding is made of 4000 series alloys as defined by the Aluminum Association while the core material can be selected from other aforementioned aluminum alloys.

As I mentioned before, the aqueous surface treating or etching solution of the present invention contains fluoridic compounds. In general, I select these compounds from the group consisting of potassium fluoride (KF), sodium fluoride (NaF), and hydrogen fluoride (HF). I generally maintain the concentration of the fluoridic compounds in solution within the range from about 0.01 wt. % to 5.0 wt. %, preferably within the range from about 0.1 to 1.0 wt. %. Although etching solutions which may contain higher concentrations of fluoridic compounds can be applied for treating the brazing sheet, I prefer the above concentrations for several reasons, including environmentally safe disposal of the used etchant.

I treat the brazing sheet surface with an etchant which I keep within the temperature range from about 150° to 212° F., preferably from about 190° to 205° F. I treat for at least 5 seconds, preferably within the range of at least about 15 seconds to about 60 seconds, depending on the temperature and concentration and/or elevated treatment temperatures allow shorter treatment times. Selection of the temperature of the treatment, the treatment time and/or the concentration of the constituents of the etchant can be readily varied with the ranges provided and remain within the discretion of the use of the process.

Subsequent to treating the brazing sheet with the aqueous fluoridic compound solution, I prefer to rinse the treated sheet with water and then dried. Because of the use of relatively low concentrations, rinsing may not always be necessary and the treated sheet, after drying, may be directly subjected to brazing.

I have found that when an aluminum sheet, which has been treated according to the invention, is subjected to brazing by any conventional aluminum brazing method, the fillet forming ability of the sheet is significantly increased as is readily measured by the increase of filler metal content in the brazed joint. Increased filler metal content in the brazed joint provides increased strength and greater fillet continuity for the joint while the absence of solid flux improves the corrosion resistance. Thus, the present process provides dual benefits over the prior art processes employed for the removal of oxide surfaces from aluminum sheet to be brazed.

The following examples will further illustrate the efficacy of the present invention.

EXAMPLE 1

I examined the effect of several aqueous fluoride solutions on the brazeability of production vacuum brazing sheet, VBS2. The VBS2 brazing sheet is a composite material comprising an AA3005-type core alloy and a modified AA4045+0.25% Mg filler alloy. I examined the brazing response of the VBS2 etched in the aqueous HF, NaF, KF, and LiF solutions described in Table 1. The brazing response was determined by using the horizontal wedge tee (HWT) specimen.

TABLE 1

Aqueous Fluoride Etchants Used to Improve Brazeability.

| Etchant | Concentration % by weight | Concentration, M | Solution Temperature, °F. | Immersion Time, seconds |
|---|---|---|---|---|
| HF | 0.5 volume % | 0.15 | 200 | 15 |
| KF | 1.0 | 0.17 | 200 | 15 |
| NaF | 0.1 | 0.024 | 200 | 15 |
| NaF | 1.0 | 0.24 | 200 | 15 |
| LiF | 1.0 | 0.38 | 200 | 15 |

All HWT test specimen pieces were acetone wiped before and vapor degreased after cutting the pieces needed. Before the specimen pieces were assembled into HWT specimens, the brazing sheet portion of the HWT was etched in the aqueous fluoride solutions detailed in Table 1. After etching, the samples were assembled into HWT test specimens. All samples were held together with pure nickel wire. All sample pieces and test specimens were handled with clean cotton gloves.

The HWT test specimens were vacuum brazed using the cycle described below:

Preheat the sample for 5 minutes at 450° F.

Transfer the sample into the braze chamber.

Ramp the sample from 450° F. to 1000° F. in 10 minutes.

Ramp the sample from 1000° F. to 1095° F. in 6 minutes.

Soak the sample at 1095° F. for 3 minutes.

Cool the sample to 1060° F. or lower and remove from the furnace.

Method of Measurement

Brazing the HWT sample causes a fillet form between the brazing sheet and the horizontal member. At the same time, a drip bead is formed along the bottom of the test specimen. Larger joints between the AA3003 member and the brazing sheet result in a smaller drip bead being formed at the bottom of the test specimen. Naturally, the opposite is also true, i.e., smaller fillets forming along the horizontal member results in smaller drip beads. If we have a reference material by which we can measure the drip bead weight, we can indirectly determine the fillet size. In this study, my reference material was the control material that was used for every test, i.e., VBS2. The reference material blank samples were not brazed. This technique results in an inverse scale, i.e., more negative fillet weights indicate larger fillets, thus better brazeability.

Results

When I exposed the VBS2 brazing sheet to the etchants described in Table 1, I discovered that KF and NaF improved the fillet sizes of the VBS2 material by nearly 200% when compared to the conventionally prepared sample, i.e., acetone wiped and vapor degreased. I also discovered, that all fluoride species do not have the same affect on the brazeability. For example, I found that LiF resulted in a slight improvement (compared to the controls) in the brazeability, as shown in FIG. 1 (and tabulated in Table 2). I also discovered that 1% (by weight) NaF and 0.5% (by volume) HF aqueous fluoride etchants resulted in inconsistent filleting, as evidenced by the range of the error bars. Based on our studies, the 1% KF and 0.1% NaF aqueous fluorides impart the greatest benefit to improving the brazeability.

TABLE 2

Comparison of the Drip Weights of Vacuum
Brazing Samples Etched in Aqueous Fluoride Solutions.

| Sample | Control Drip wt., g | 0.172M KF Drip wt., g | 0.0238M NaF Drip wt., g | 0.15M HF Drip wt., g | 0.238M NaF Drip wt., g | 0.385M LiF Drip wt., g |
|---|---|---|---|---|---|---|
| 1 | 0.0201 | −0.0050 | −0.0056 | −0.0076 | 0.0312 | 0.0165 |
| 2 | 0.0160 | −0.0100 | −0.0017 | 0.0039 | 0.0097 | 0.0106 |
| 3 | 0.0183 | −0.0065 | −0.0003 | 0.0072 | −0.0105 | |
| 4 | 0.0191 | | | | 0.0057 | |
| 5 | 0.0190 | | | | 0.0070 | |
| 6 | 0.0109 | | | | 0.0000 | |
| 7 | 0.0160 | | | | −0.0115 | |
| 8 | 0.0126 | | | | 0.0040 | |
| 9 | | | | | 0.0022 | |
| Average | 0.0165 | −0.0072 | −0.0025 | 0.0012 | 0.0042 | 0.0135 |

EXAMPLE 2

The same experimental procedures were used in this example as used in Example 1. In this example, I used our newly discovered 1% KF and 0.1% NaF fluoride treatments in a mill oil contamination study. The brazing sheet material in all cases was VBS2. I fluoride treated the brazing sheet as described in Example 1. After fluoride treating the VBS2, I exposed the samples to dirty rolling mill lubricant (DML), neat lubricant (the lubricant was not diluted in any way), and clean rolling mill lubricant (CML). One sample of VBS2 was acetone wiped, vapor degreased, and had its filler metal surface lightly abraded with sandpaper before exposure to neat lubricant.

The samples were immersed in the lubricants for 24 hours, vapor degreased and vacuum brazed. Our results, shown in FIG. 2 (and detailed in Table 3), clearly indicate the pretreating the VBS2 with our new KF aqueous fluoride etchant and exposing them to different lubricants resulted in larger fillets than the unexposed control material and the VBS2 sample with the abraded surface. The aqueous NaF solution did not show the same degree of improvement as did the KF solution.

TABLE 3

Effect of the Aqueous Fluoride Etches on the Brazeability
of Vacuum Brazing Sheet Exposed to Rolling Mill Lubricants.

| Test No. | Control Drip wt., g | 0.0238 M NaF Drip wt., g | 0.172 M KF Drip wt., g | 0.172M KF + Dirty Lube Drip wt., g | 0.172M KF + Norpar Drip wt., g |
|---|---|---|---|---|---|
| 1 | 0.0168 | 0.008 | −0.02 | 0.004 | −0.004 |
| 2 | 0.0154 | 0.017 | −0.016 | −0.003 | −0.009 |
| 3 | 0.0196 | 0.01 | −0.015 | 0.003 | −0.005 |
| Average | 0.0173 | 0.0117 | −0.0170 | 0.0013 | −0.0060 |

| Test No. | 0.172M KF + Clean Mill Lube Drip wt., g | 0.0238 M NaF + Dirty Mill Lube Drip wt., g | 0.0238 M NaF + Norpar Drip wt., g | 0.0238M NaF + Clean Mill Lube Drip wt., g | Abraded Surface + Norpar Drip wt., g |
|---|---|---|---|---|---|
| 1 | −0.007 | 0.0176 | 0.0226 | 0.0111 | 0.0033 |
| 2 | −0.002 | 0.0231 | 0.0084 | 0.0158 | 0.0129 |
| 3 | −0.006 | 0.0286 | 0.0098 | 0.011 | 0.0026 |
| Average | −0.0050 | 0.0231 | 0.0136 | 0.0126 | 0.0063 |

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A process for improving the fillet-forming capability of brazeable aluminum articles, comprising the steps of:
   (a) providing a brazeable aluminum article, having at least one surface;
   (b) contacting the at least one surface with a dilute, aqueous solution containing at least one of potassium fluoride (KF) and sodium fluoride (NaF), for at least 5 seconds at a temperature ranging from about 150° to 212° F. to produce a surface which can be readily brazed.

2. The process of claim 1 wherein the aqueous solution includes a concentration ranging from about 0.01 wt. % to 5.0 wt. % KF or NaF.

3. The process of claim 1 wherein the aluminum article is aluminum alloy vacuum brazing sheet.

4. The process of claim 1 wherein the aluminum article is a radiator.

5. The process of claim 1 wherein the aluminum article is a component of an aluminum alloy heat exchanger.

6. The process of claim 5 wherein the aluminum alloy heat exchanger component is selected from fins, headers and tubes.

7. The process of claim 1 wherein the aluminum article is made from an Aluminum Association aluminum alloy of the 1000, 3000, 4000, 5000, or 6000 series.

8. The process of claim 7 wherein the alloy is clad with an Aluminum Association 4000 series aluminum alloy.

9. A process for improving the fillet-forming capability of brazeable aluminum articles, comprising the steps of:
   (a) providing a brazeable aluminum article, having at least one surface;
   (b) contacting the at least one surface with a dilute, aqueous solution containing at least one fluoridic compound chosen from the group consisting of potassium fluoride (KF) and sodium fluoride (NaF), for at least 5 seconds at a temperature ranging from about 150° to 212° F.

10. The process of claim 9 wherein the aqueous solution includes a concentration ranging from about 0.01 wt. % to 5.0 wt. % fluoridic compounds.

11. The process of claim 9 wherein the flouridic compounds are in contact with the brazeable aluminum article for at least 15 seconds.

12. The process of claim 9 wherein the flouridic compounds are in contact with the brazeable aluminum article for a time between 15 and 180 seconds.

13. A process for improving the fillet-forming capability of brazeable aluminum articles, comprising the steps of:
   (a) providing a brazeable aluminum article, having at least one surface;
   (b) contacting the at least one surface with a dilute, aqueous solution containing at least one of potassium fluoride (KF) and sodium fluoride (NaF), for at least 5 seconds to produce a surface which can be readily brazed.

14. The process of claim 13 wherein the aqueous solution includes a concentration ranging from about 0.01 wt. % to 5.0 wt. % KF or NaF.

15. The process of claim 14 wherein the aqueous solution is in contact with the brazeable aluminum article for a time between 15 and 180 seconds.

* * * * *